G. WALLACE.
WELDED JOINT FOR TRAMWAYS AND LIGHT RAILWAYS.
APPLICATION FILED FEB. 16, 1922.
1,420,614.
Patented June 20, 1922.
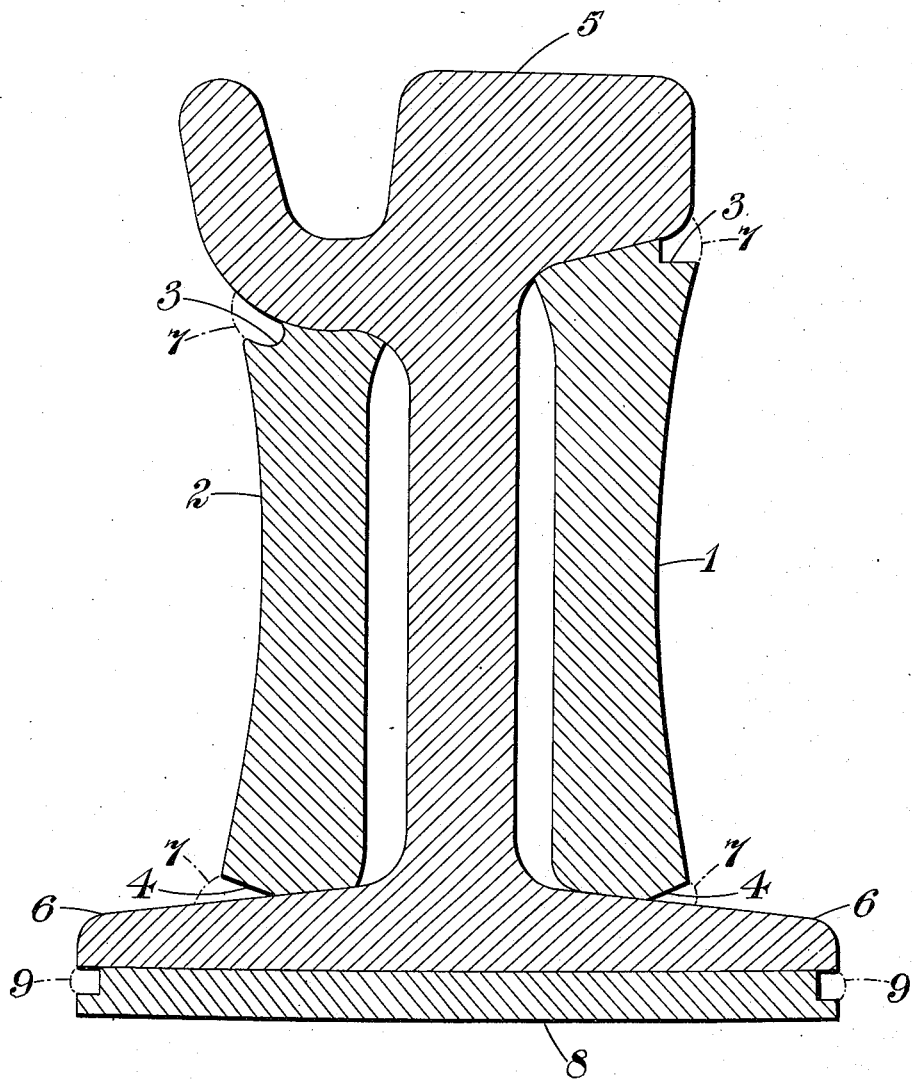

UNITED STATES PATENT OFFICE.

GEORGE WALLACE, OF SHEFFIELD, ENGLAND, ASSIGNOR OF ONE-HALF TO HARRY BOLTON, OF SHEFFIELD, ENGLAND.

WELDED JOINT FOR TRAMWAYS AND LIGHT RAILWAYS.

1,420,614.          Specification of Letters Patent.     Patented June 20, 1922.

Application filed February 16, 1922. Serial No. 536,980.

*To all whom it may concern:*

Be it known that I, GEORGE WALLACE, a subject of the King of England, residing at Sheffield, in Yorkshire, England, have invented certain new and useful Improvements in or Relating to Welded Joints for Tramways and Light Railways (for which I have filed application in Great Britain No. 172,241, Jan. 28, 1921); and I do hereby declare that the following is a full, clear, and exact description of the same.

This invention relates to welded joints of rails for tramways or light railways of the kind made by welding the edges of a fish-plate to the rails on each side of the joint, the object of the invention being to provide means for obtaining a stronger and more efficient weld of the fish-plates to the rails.

It is well known that an electric (or acetylene) welded joint is made by drawing the welding electrode or pencil in contact with the two surfaces to be joined. In some cases, as for example, in welding two rounded edges or when the parts to be welded can be disposed in the requisite position, a groove is formed between them which is filled up by the welding process. In other cases, as in welding the edges of a fish-plate to the head and base of the rails, great difficulty has been experienced in making a strong and reliable joint and heretofore these welded fish-plates have been further secured by bolts or rivets passing through them and through the web of the rails. According to the present invention, however, the longitudinal edges of the fish-plates are specially shaped at their outer corners to provide a groove between them and the head and base respectively of the rails, along which groove the welding electrode or pencil is drawn. In this manner a very strong and reliable joint is obtained which enables the bolts or rivets heretofore used to be entirely dispensed with. Preferably the exterior corners of the longitudinal edges of the fish-plate which are intended to come into contact with the head and base respectively of the rails are formed with a groove or bevel, the welding being effected along the groove so formed. If desired a sole plate of any known form may be used, and it may have the exterior corners of the surface contacting with the rails grooved or bevelled and welded.

The accompanying drawing represents a transverse section through a rail joint according to the present invention.

In making a welded joint according to the present invention the fish-plates 1, 2, before being placed in position are each grooved as at 3 or bevelled as at 4 along the two exterior corners of the longitudinal edges which are intended to come into contact with the head 5 and base 6 respectively of the rails. The shape of the groove 3 and the amount of bevelling 4 may be varied within limits (two shapes of groove being shown in the drawing), the object being to provide a groove (when the fish-plates are in position) between the fish-plate edges and the head or base of the rail along which the welding electrode or pencil may be drawn, so that the groove is more or less filled up during the welding process as indicated by the chain lines 7 in the drawing, and thus increased surfaces of the fish-plates and of the rails are united at each weld as compared with the results obtained by the usual process where the exterior corners of the fish-plates come close to the rails.

The choice as to whether to groove or to bevel the edges of the fish-plates depends largely on the shape of the parts. For the ordinary tramway rail it is generally preferred to groove the corner of the edge to be welded to the head of the rails and to bevel the corner of the opposite edge.

A sole plate 8 may be welded to the base of the rail at the joint and the exterior corners of the surface contacting with the rails may be grooved or bevelled and welded as indicated at 9.

In making a welded joint according to the present invention the fish-plates 1, 2, may be held in position for the welding operation by bolts passing through registering holes in both the fish-plates and in the webs of the rails. It is preferred, however, to hold them in position by means of a bar on each side of the rails, longer than the fish-plates, supported longitudinally of the rails and centrally of the fish-plate and pressed towards one another by pressure devices arranged clear of the fish-plates and carried by jaws bridging the rail.

What I claim is:—

1. A rail joint comprising in combination with the abutting rail ends, a flat sole plate parallel to and in contact with the base of each rail and substantially equal in width to the rail base, the plate having its upper longitudinal edges cut away to provide, between the plate and adjacent portions of the rails, recesses for the reception of welding material.

2. A rail joint comprising a pair of abutting rail ends, a pair of substantially flat fish plates disposed parallel to the webs of the rails, each plate having bearing surfaces along its entire length contacting with the head and base respectively of the rails, the exterior longitudinal edges of the plates being cut away to provide vertically aligned recesses between the plates and adjacent portions of the rails, and a flat sole plate substantially the width of the base of the rails and having its upper longitudinal edges cut away to form recesses between the plate and adjacent portions of the rails, the rails and plates being autogenously united by welding in the recesses.

In testimony whereof I hereunto affix my signature.

GEORGE WALLACE.

Witnesses:
HAROLD A. NEWELL,
J. H. CALDWELL.